United States Patent
Dillon et al.

(10) Patent No.: US 12,278,910 B2
(45) Date of Patent: Apr. 15, 2025

(54) SECURING GROUP MESSAGES OVER HYPERTEXT TRANSFER PROTOCOL WITH KEY MANAGEMENT AND ROTATION FOR MULTI-PARTY GROUPS

(71) Applicant: SENTRIQS, INC., Reno, NV (US)

(72) Inventors: Paul Dillon, Erie, PA (US); Kyle Bebee, Kalispell, MT (US); Damien Fortune, Savannah, GA (US); Robert Wilson, Reno, NV (US)

(73) Assignee: SENTRIQS, INC., Reno, NV (US)

( * ) Notice: Subject to any disclaimer, the term of this patent is extended or adjusted under 35 U.S.C. 154(b) by 252 days.

(21) Appl. No.: 18/048,591

(22) Filed: Oct. 21, 2022

(65) Prior Publication Data

US 2023/0134598 A1    May 4, 2023

Related U.S. Application Data

(60) Provisional application No. 63/274,312, filed on Nov. 1, 2021.

(51) Int. Cl.
*H04L 9/32* (2006.01)
*H04L 9/08* (2006.01)

(52) U.S. Cl.
CPC .......... *H04L 9/3247* (2013.01); *H04L 9/0822* (2013.01); *H04L 9/0861* (2013.01)

(58) Field of Classification Search
CPC ... H04L 9/3247; H04L 9/0822; H04L 9/0861; H04L 63/0435; H04L 63/166; H04L 63/168; H04L 63/0428
USPC .......................................................... 713/176
See application file for complete search history.

(56) References Cited

U.S. PATENT DOCUMENTS

| 8,560,843 | B1 | 10/2013 | Moscaritolo et al. |
| 11,050,723 | B1 | 6/2021 | Mahdavi et al. |
| 11,824,840 | B1 * | 11/2023 | Meixler ................ H04L 9/3247 |
| 2016/0365982 | A1 | 12/2016 | Tutt et al. |

OTHER PUBLICATIONS

International Search Report and Written Opinion issued in corresponding International Application No. PCT/US2022/078528 on Jan. 25, 2023 (15 pages).

(Continued)

*Primary Examiner* — Bryan F Wright
(74) *Attorney, Agent, or Firm* — Perkins Coie LLP

(57) ABSTRACT

An end-to-end mechanism is disclosed herein for transporting encrypted messages over hypertext transport protocol (HTTP) sent to a group of recipients. In particular, the disclosed mechanism receives a message (e.g., as an input from a user) and encrypts that message using an encryption mechanism with a key unique to a particular user and to the message (e.g., different messages are encrypted using different keys). The encrypted message is then stored in a generated object along with other metadata needed for message processing. Once the object is generated, it is signed and encoded into a binary representation that is then sent to a server. The server system receives the binary representation and decodes it back into the object. The metadata of the object is then used to route the message to the correct recipient applications for decryption.

19 Claims, 6 Drawing Sheets

(56) References Cited

OTHER PUBLICATIONS

Beurdouche et al., "The Messaging Layer Security (MLS) Architecture," The Wayback Machine, Network Working Group, Internet-Draft: draft-ietf-mls-architecture-latest, published on Jun. 23, 2021, https://messaginglayersecurity.rocks/mls-architecture/draft-ietf-mls-architecture.html (31 pages).

* cited by examiner

| Name | Value |
|---|---|
| Encrypted Message | ed07628753e86365e841e92bfc50d8c |
| Sender ID | Dylan |
| Recipient Group ID | Content Developers |
| Key index | 6 |
| Signature | MIIBOgIBAAJBAKkbSUT9/Q2uBfGRau6/XJyZhcF5abo7b37I5hr3EmwGykdzyk8GSyJK3TOrjyl0sdJsGbFmgQaRyV+DLE7750EC |

SECURING GROUP MESSAGES OVER HYPERTEXT TRANSFER PROTOCOL WITH KEY MANAGEMENT AND ROTATION FOR MULTI-PARTY GROUPS

CROSS-REFERENCE TO RELATED APPLICATION(S)

This application claims the benefit of priority of U.S. Provisional Patent Application No. 63/274,312, filed Nov. 1, 2021. The content of the foregoing application is incorporated herein in its entirety by reference.

BACKGROUND

Many messaging applications exist that enable users to communicate via the Internet. Those messaging applications include an ability to communicate with a single person and a group of people. Furthermore, those applications employ various encryption technologies to enable secure communications both for usage for person-to-person communications and person to group communications. Some applications use Message Layer Security (MLS) encryption to perform encryption on person to group communications. MLS enables encryption of person to group communications. When a message is encrypted by the MLS protocol, the message and accompanying metadata are stored in a particular format, which makes it inefficient and in certain cases impossible to use in web-based environments (e.g., when using JavaScript runtime in a web browser environment). For example, the MLS protocol outlines how messages should be formatted in terms of order of data types and size of each data type. This does not work well in a web-browser environment because more flexibility is needed to format and transport the message data.

SUMMARY

To address these and other issues an end-to-end mechanism is disclosed herein for transporting encrypted messages over hypertext transport protocol (HTTP) sent to recipients in a group. In particular, the disclosed mechanism receives a message (e.g., as an input from a user) and encrypts that message using an encryption mechanism with a key unique to a particular user and to the message (e.g., different messages are encrypted using different keys). The encrypted message is then stored in a generated object along with other metadata needed for message processing. Once the object is generated, it is signed and encoded into a binary representation that is then sent to a server. The server system receives the binary representation and decodes it back into the object. The metadata of the object is then used to route the message to the correct recipient applications for decryption.

A message processing system may be used to perform the operations disclosed here. The message processing system may reside on a combination of a client device and server. In some embodiments, the portion of the message processing system residing on the client device may be an application executed within a web browser that uses, for example, a JavaScript Runtime Environment for executing message processing system operations. When a user inputs a message into an application, the message processing system receives that message and determines that the message is addressed to a plurality of users in a group. The message processing system may then encrypt the message using operations described below.

The message processing system may retrieve a first key generation secret generated by a key generation algorithm for the user. The key generation algorithm may be configured to generate, using a key generation secret, a new key generation secret and a new encryption key for message encryption. For example, the message processing system may maintain one or more groups with multiple users as members. When a member of the group sends out a message to the other members, that message is encrypted in such a way that each user (e.g., using the device receiving the message) within the group is able to decrypt the message. As there are multiple users in the group, one-to-one encryption/decryption methods may not be used in these cases. In addition, for better security, each message sent out by a member of the group may be encrypted using a different key. Thus, if a malicious actor gains access to one key, that malicious actor will only be able to decrypt a single message. Thus, the message processing system may retrieve a key generation secret that was generated during a previous execution of the key generation algorithm. In some embodiments, the message processing system may be executed within a web browser and may retrieve the first key generation secret from web browser storage.

The message processing system may store the first key generation secret in a binary tree structure and may retrieve the first key generation secret from that binary tree for a particular group (e.g., within the web browser storage). In particular, the message processing system may access (e.g., within the web browser storage), an encrypted binary tree that stores a number of pieces of data. The binary tree may store a plurality of user identifiers of a plurality of users with the group. The binary tree may also store a plurality of key generation secrets such that each key generation secret of the plurality of key generation secrets is a last generated key generation secret for a corresponding user. In some embodiments, each user identifier may correspond to a leaf node within that binary tree. The message processing system may then decrypt the encrypted binary tree into a data structure representing a binary tree and retrieve the first key generation secret from a leaf node of the binary tree, such that the leaf node is associated with the user.

The message processing system may input the retrieved key generation secret into the key generation algorithm to generate an encryption/decryption key and a new key generation secret for the next iteration. In particular, the message processing system may receive, from the key generation algorithm based on inputting the first key generation secret, a second key generation secret and a first encryption key. For example, when the message processing system inputs the key generation secret into the key generation algorithm, the key generation algorithm may output a next key generation secret (e.g., for generating the next message encryption key) and the message encryption key for encrypting the current message. In some embodiments, the encryption key may also serve as a decryption key.

The message processing system may then encrypt the message using the first encryption key into an encrypted message and may store the second key generation secret. The second key generation secret may be stored in association with the user. In some embodiment, the second key generation secret may be stored within the web browser storage (e.g., after it is encrypted). For example, the message processing system may replace the first key generation secret with the second key generation secret in a lead node of the binary tree associated with the user.

The message processing system may then associate metadata with the message in the form of a set of name-value pairs. For example, the name value pairs may include the sender's identifier, a group identifier, an index associated with the secret, etc. The message processing system may then generate an encrypted message object. The encrypted message object may include a name-value pair for the encrypted message and the plurality of name-value pairs. When the encrypted message object is complete, the message processing system may generate a cryptographic signature for the encrypted message object and add the cryptographic signature as a name-value pair to the encrypted message object.

At this point, the message processing system may encode name-value pairs associated with the encrypted message object into a transport representation of the object and generate a hypertext transport protocol request containing that transport representation. When each hypertext protocol request is generated, it is transmitted to a server using the hypertext transport protocol that the server is configured to process. In some embodiments, the transport payload may be a binary representation while in other embodiments, the transport payload may be a string or textual representation.

The message processing system on the server may receive those hypertext transport protocol requests and decode the transport representations into name-value pairs. The message processing system may then determine, using the name-value pairs, a group associated with the encrypted message object and may generate another set of hypertext transport protocol requests containing the binary representation of the object. The message processing system may then transmit the second set of hypertext transport protocol requests to those recipients in the group that are currently active.

Furthermore, the message processing system may store the binary representations in a database, and transmit them to recipients as they connect to the server in the future. For example, when a user activates a messaging application on the client device, a client device will generate a new hypertext transport protocol message indicating a query for any outstanding messages. The message processing system may generate a response containing the binary representations of all messages stored in the database for the corresponding client device and may transmit the response to the client device.

The message processing system may also enable adding users to a group. For example, the message processing system may receive a request to add a user to a group and, after authentication and authorizing the request may add a new leaf node and other intermediate nodes to the binary tree. The new leaf node will represent the new user and may have a new key generation secret. The message processing system may update all the user devices within the group with the new tree nodes. In addition, the message processing system may enable generating new groups by generation new binary trees and distributing those binary trees to user devices of users within the group.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 3 shows examples of name-value pairs, in accordance with some embodiments.

DETAILED DESCRIPTION

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, well-known structures and devices are shown in block diagram form to avoid unnecessarily obscuring the disclosure.

Figure 1:
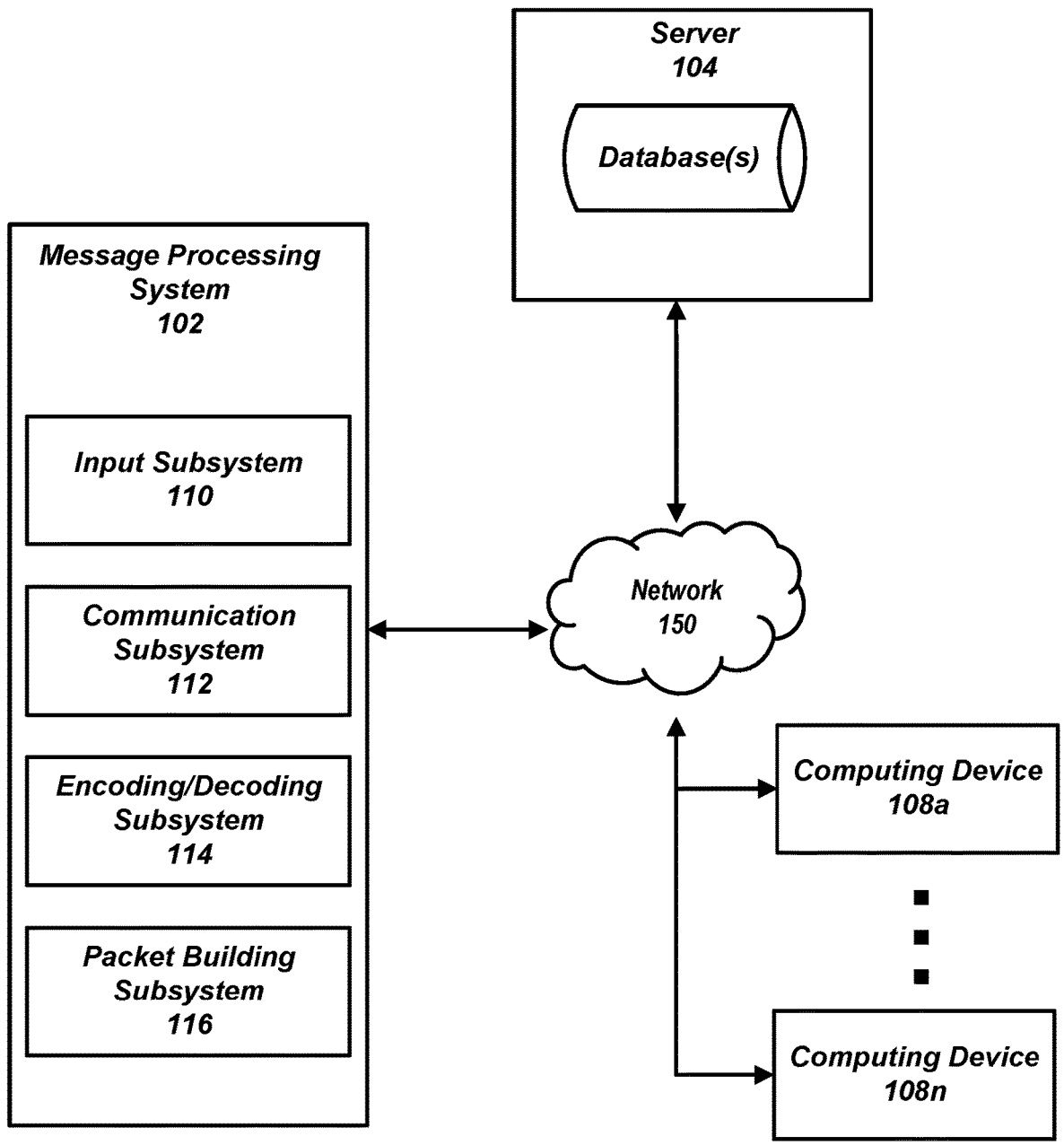
FIG. 1 illustrates an example computing environment for transporting encrypted messages over hypertext transport protocol sent to a group of recipients, in accordance with some embodiments of this disclosure.

FIG. 1 shows an example computing system 100 for transporting encrypted messages over hypertext transport protocol sent to a group of recipients. Environment 100 includes message processing system 102, and server 104, and computing devices 108a-108n. Message processing system 102 may execute instructions for transporting encrypted messages over hypertext transport protocol sent to a group of recipients. Message processing system 102 may include software, hardware or a combination of the two. For example, message processing system 102 may be a physical computing device or a virtual computing device that is running on a physical computing device. Message processing system 102 may be hosted on a personal computer, a smart phone, a laptop computing device, an electronic tablet, or another suitable computing device. In some embodiments, message processing system 102 may be hosted on a cloud computing device and may be accessed by a thin client. Some components of message processing system 102 may be hosted on a server device (e.g., server 104). Message processing system 102 may include input subsystem 110, communication subsystem 112, encoding/decoding subsystem 114, and packet building subsystem 116. Message processing system 102 may include other components (e.g., as described in FIG. 4).

Input subsystem 110 may include software components, hardware components, or a combination of both. For example, input subsystem 110 may include one or more input devices (e.g., a keyboard, mouse, microphone, etc.) coupled with software to drive those devices. Communication subsystem 112 may include software components, hardware components, or a combination of both. For example, communication subsystem 112 may include a network card (e.g., a wireless network card and/or a wired network card)

that is coupled with software to drive the card. Encoding/decoding subsystem 114 may include software components, hardware components, or a combination of both. For example, encoding/decoding subsystem 114 may include software components that access data in memory and/or storage, and may use one or more processors to perform its operations. Packet building subsystem 116 may include software components, hardware components, or a combination of both. For example, packet building subsystem 116 may include software components that access data in memory and/or storage, and may use one or more processors to perform its operations.

Server 104 may host server components associated with message processing system 102 as well as other server components. In some embodiments server 104 may host server-side components for multiple applications while those applications may have a client-side component that is executed on a client device (e.g., system 102 and or computing devices 108a-108n). Server 104 may include software, hardware, or a combination of the two. For example, server 104 may be a physical server, or a virtual server that is running on a physical computer system. Network 150 may be a local area network, a wide area network (e.g., the Internet), or a combination of the two. Computing devices 108a-108n may include components similar to components of message processing system 102.

The operations described below may use the following concepts related to encryption of group messages. In an established group, each group member may maintain (e.g., within a web browser or another type of storage) cryptographic information needed to (1) encrypt its own messages and (2) decrypt the messages received from other group members. The encryption mechanism may employ a traditional symmetric key encryption algorithm, which may require the sender and receiver(s) to have access to a common, single shared key that may be an input to the encryption and decryption processes. Several mechanisms may be used to safely and securely distribute to all group members the data for establishing the set of shared keys that may be employed when invoking the symmetric key encryption.

The first mechanism may involve a concept referred to as a "ratchet". As referred to herein, the term ratchet refers to a mechanism that takes one secret (e.g., a key generation secret) as input and deterministically produces two outputs: (1) a secret to be used with the symmetric key encryption algorithm (e.g., an encryption/decryption key) and (2) a secret intended to be cycled back as the next input to the ratchet mechanism (the new key generation secret). With this mechanism, a sender and each recipient may exchange an initial shared secret to be used as the first input to their respective copies of a ratchet and then each independently produce the same sequence of shared secrets where the sender may utilize one output from the ratchet to produce an encrypted message and the recipient may utilize that output to decrypt the message before they both discard the secret and move on to the next secret in the sequence.

Each group member may maintain a set of ratchets, assigning one to each group member such that the assigned ratchet may be utilized when the corresponding group member sends a message. In this way, the system may ensure that each member receives the initial shared secret for each of the ratchets in the group.

To that end, the second mechanism may employ a binary tree structure that allows for the efficient computation of these initial secrets. In some embodiments, within the binary tree structure, the ratchets may be arranged for the group members as leaves of the tree. Then, starting with an initial, single input secret (e.g., key generation secret) assigned to the root of the tree, the message processing system may deterministically derive secrets to assign to each of the root's children in a fashion similar to the derivation made by a ratchet. This process may then be repeated with the children of the root's children down the tree until a unique secret (e.g., key generation secret) is assigned to each of the leaves of the tree. Each unique secret may then serve as the initial input to the ratchet corresponding to the group member at that position in the binary tree. Thus, a single initial secret, the root secret, may be used to derive the set of secrets that initialize the ratchets within the binary tree.

Furthermore, the message processing system may distribute the root secret to all group members without disclosing the secret to any unintended third party, which is achieved utilizing a key exchange or key encapsulation mechanism, but one where the public/private key pair used to secure the root secret is not chosen randomly. Instead, the key pair may also be deterministically derived from other secrets.

A third mechanism may again employ the same binary tree to compute (1) secrets used to derive the root secret and (2) a set of public/private key pairs assigned to the interior nodes of the tree and used to encapsulate these secrets for distribution to other group members. The mechanism may cause the binary tree to be unbalanced and left-filled, such that all nodes other than the root have a sibling. With an existing group, a computing device of each group member (e.g., computing devices 108a-108n) may store the position of its own leaf node in the binary tree and may be in possession of the private keys assigned to the parent of that leaf node and each subsequent parent up to the root node. In addition, each computing device may store its own public/private key pair, assigned to its own leaf node, which may formally identify the member to the group. Each computing device may also be in possession of the public keys assigned to all the nodes in the binary tree.

When one group member initiates an action for which the ratchets may be (re)initialized, the mechanism may utilize a path in the binary tree from the leaf corresponding to this acting group member up to the root. The parent of the leaf in this path, as well as each parent up to the root, may have one inactive child, the child that is not a member of this path. The public key for this inactive child may be used with the key encapsulation algorithm to generate a new secret (e.g., key generation secret) to assign to the parent, or a new secret (e.g., new key generation secret) may randomly be chosen and encrypted with the public key. The message processing system may add the encrypted secret to a message to be distributed to the other group members. The secret may also be used to derive a new public/private key pair to assign to the parent. The secret may also be used as the input to derive an output secret that is assigned to the parent of the parent. The message processing system may repeat the process for each parent in the path using the previous step's output secret to derive the new key pair and next output secret. The final output secret may then be defined as the root secret described above. The result of this mechanism is (1) a message containing a list of novel secrets, each encrypted with a different public key, and (2) a new set of key pairs for the nodes of the tree along this path.

When the message processing system receives the message, another group member may be assured that at least one private key positioned along its path from leaf to root corresponds to one of the public keys used to encrypt the secrets in the message. The message processing system may use this private key to decrypt the corresponding secret, thereby allowing the member to complete the operation, repeatedly deriving secrets and key pairs for nodes in a local copy of the binary tree up to the root. The message processing system may ultimately arrive at the original root secret derived by the sender.

Figure 2:
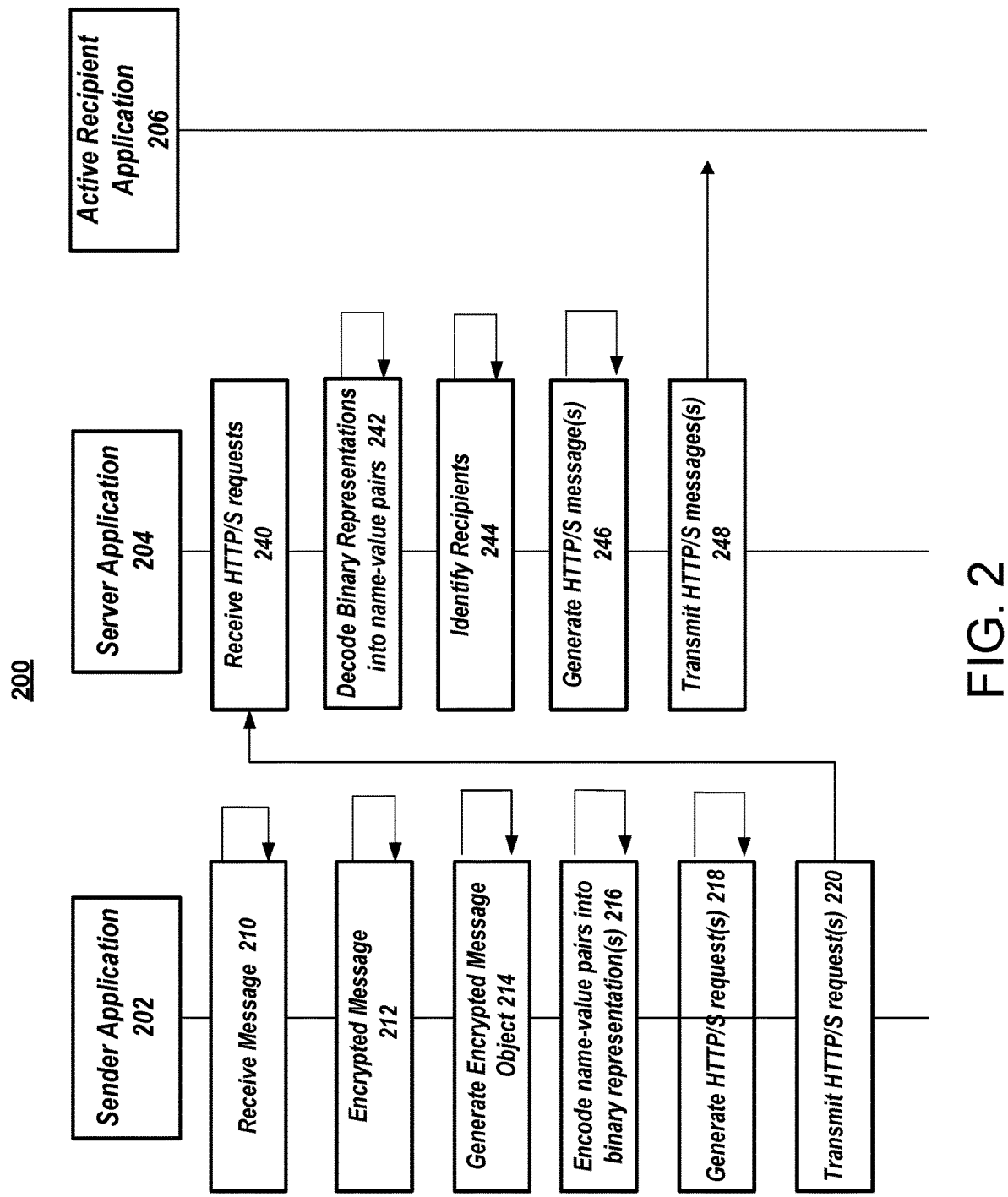
FIG. 2 exemplifies operations on messages as they are transported over hypertext transport protocol, in accordance with some embodiments of this disclosure.

FIG. 2 exemplifies operations performed on messages as they are transported over hypertext transport protocol. System 200 may include sender application 202 residing on a client device of a sender (e.g., on an electronic tablet, smart phone, or another suitable sender device). Sender application 200 may reside within a web browser application (e.g., within Chrome, Firefox, or another suitable web browser application). Sender application 202 may receive a message at 210. Sender application 202 may receive the message from input subsystem 110. For example, a user may type the message using an on-screen keyboard or may dictate the message using a microphone. In some embodiments, sender application 202 may be an application being executed with the web browser. The message may be a message from a user addressed to a group of users such that the user is a member of the group.

Encoding/decoding subsystem 114 may then receive the message from input subsystem 110 and generate encrypted message 212. Encoding/decoding subsystem 114 may retrieve a first key generation secret generated by a key generation algorithm for the user. The key generation algorithm may generate, using a key generation secret, a new key generation secret and a new encryption key for message encryption. In some embodiments, the first key generation secret may be stored in a binary tree (e.g., a binary tree as described above) within web browser storage in an encrypted form. Thus, encoding/decoding subsystem 114 may retrieve an encrypted binary tree from within web browser storage and may decrypt the binary tree. Once the binary tree is decrypted, encoding/decoding subsystem 114 may use an identifier associated with the user to retrieve the first key generation secret.

In some embodiments, the encoding/decoding subsystem 114 may use the following operations for key retrieval. The encoding/decoding subsystem 114 may access a binary tree (e.g., as discussed above). In some embodiments, the binary tree may be stored within web browser storage and may be encrypted so that other applications and process on the device are not able to access the binary tree within the web browser storage as the web browser storage may be shared with other applications. The binary tree may store a plurality of user identifiers of a plurality of users with the group. The user identifiers may be represented by different ratchets within the tree such that each ratchet represents each user in the group. In addition, the binary tree may store a plurality of key generation secrets. Each key generation secret may be a last generated key generation secret for a corresponding user. For example, each ratchet may have been previously "turned" to generate a key generation secret for the next turn of the ratchet. The turning of the ratchet may be the encoding/decoding subsystem 114 inputting a particular key generation secret into the key generation algorithm to get a new key generation secret and a new encryption/decryption key for either encrypting or decryption a particular message.

Encoding/decoding subsystem 114 may decrypt the encrypted binary tree into a data structure representing the binary tree. For example, if message processing system 102 is executed within a web browser, encrypting/decrypting subsystem 114 may retrieve the encrypted binary tree, from web browser storage, and decrypt the encrypted binary tree using an appropriate algorithm/key combination. Encoding/decoding subsystem 114 may then retrieve the first key generation secret from a leaf of the binary tree associated with the user. For example, encoding/decoding subsystem 114 may perform a search of the binary tree based on the identifier of the user.

Encoding/decoding subsystem 114 may input the first key generation secret into the key generation algorithm to generate an encryption key. The encryption key may be used to both encrypt the message by the sender's device and decrypt the message by recipient devices. Thus, as discussed above, the encryption key may be both an encryption key and a decryption key. In particular, encoding/decoding subsystem 114 may receive, from the key generation algorithm based on inputting the first key generation secret, a second key generation secret and a first encryption key. In some embodiments, the operation of the key generation algorithm may be referred to as turning the ratchet (e.g., a ratchet operation described above). The ratchet may be associated with a particular user. Thus, each user may have an associated ratchet in the binary tree. That is, when a particular user device generates a message to be sent, the encoding/decoding system may turn only the ratchet associated with that user to generate a new encryption key and a new key generation secret. Furthermore, when a device of a particular recipient processes the message, that device may turn only the ratchet associated with sender to arrive at the same encryption key which is used as a decryption key.

Encoding/decoding subsystem 114 may then encrypt the message using the encryption key. In particular, encoding/decoding subsystem 114 may encrypt the message using the first encryption key into an encrypted message. The encryption operation may use any encryption algorithm that supports symmetric encryption/decryption. Furthermore, encoding/decoding subsystem 114 may store the second key generation secret to be used during the next message encryption operation. In particular, encoding/decoding subsystem 114 may store the second key generation secret. The second key generation secret may be stored in association with the user. For example, encoding/decoding subsystem 114 may locate, within the binary tree, the leaf of the binary tree associated with the user. Encoding/decoding subsystem 114 may perform a search operation on the binary tree using an identifier of the user to locate a leaf node associated with that user. The leaf node associated with the user may store a key generation secret from a previous message encryption operation (e.g., the leaf node may store the first key generation secret). Encoding/decoding subsystem 114 may replace the first key generation secret within the leaf with the second key generation secret. In some embodiments, encoding/decoding subsystem 114 may encrypt the updated binary tree before storing the encrypted updated binary tree. For example, if encoding/decoding subsystem 114 is executed within a web browser, encoding/decoding subsystem 114 may encrypt the updated binary tree and may store it within web browser storage.

Encoding/decoding subsystem 114 may determine a plurality of name-value pairs from metadata associated with the message. For example, when a sender composes a message, the message is addressed to a particular group and uses a particular encryption scheme. Thus, name-value pairs may include an identifier of the group, an indicator of how to decrypt the message, an indication of the encryption scheme, an identifier of the sender and other name-value pairs.

Encoding/decoding subsystem 114 may generate an encrypted message object 214. The encrypted message object may include a name-value pair for the encrypted message and the other name-value pairs generated for the message. The encrypted message object may be created using JavaScript or another suitable language. In some embodiments, encoding/decoding subsystem 114 may generate a cryptographic signature for the encrypted message object and add the cryptographic signature as a name-value pair to the encrypted message object. The cryptographic signature may be used to authenticate that the message is authentic.

FIG. 3 illustrates an example of fields that may be part of the encrypted message object. For example, encrypted message field 303 may store the encrypted message. Sender ID field 306 may store an identifier of the sender (e.g., identifier of the user). This identifier may be used during the decryption process to determine the correct key generation secret for generating a decryption key (e.g., for turning the right ratchet) for decrypting the message. For example, the encoding/decoding system on a device of a recipient may search a local binary tree associated with the group using the sender ID to identify the correct leaf node and extract, from that leaf node, the key generation secret. Recipient group id field 309 may store the recipient group for the message. For example, encoding/decoding subsystem 114 on the device of a recipient of the message may use recipient group id field 309 to identify the right binary tree for the search. That is, if a user is a member of multiple groups, encoding/decoding subsystem 114 may determine the correct group and the correct binary tree. Other fields may be included in association with the encrypted message object. For example, key index may help identify the key while the signature may help authenticate the message.

Encoding/decoding subsystem 114 may encode name-value pairs associated with the encrypted message object into one or more transport representations 216. For example, encoding/decoding subsystem 114 may retrieve each name value pair from the encrypted message object (e.g., sequentially or in parallel), encode each value pair into a binary format are string/text format, or another suitable format. Encoding/decoding subsystem 114 may also combine the name values pairs into a binary sequence of bytes or string/textual sequence of characters representing the object. In some embodiments, the encoding operation may be referred to as a serialization of the encrypted message object.

In some embodiments, encoding/decoding subsystem 114 may determine a type of encoding to use (e.g., binary or string/text encoding). Thus, encoding/decoding subsystem 114 may determine whether the server supports binary encoding. For example, encoding/decoding subsystem 114 on a computing device of a user may transmit a request to the server for encoding options. The server may transmit a response indicating whether binary encoding is supported, text/string encoding is supported, or both are supported. The server may respond with the supported encoding schemes. In response to determining that the server supports the binary encoding, encoding/decoding subsystem 114 may encode the plurality of name-value pairs associated with the encrypted message object into one or more binary representations. Encoding/decoding subsystem 114 may select each name-value pair and perform the encoding on each field of the name value pair. In response to determining that the server does not support the binary encoding, encoding/decoding subsystem 114 may encode the plurality of name-value pairs associated with the encrypted message object into one or more string representations. For example, encoding/decoding subsystem 114 may encode the name-value pairs into a particular string or text encoding that will enable the server to decode the data using a reverse process.

The binary or string representation of the encoded name-value pairs may be passed to packet building subsystem 116. Packet building subsystem 116 may generate a hypertext transport protocol request 218 for the binary or string representation of the encrypted message object. In some embodiments, packet building subsystem 116 may generate request 218 for each binary or string representation of the plurality of representations. Each request may include hypertext transport protocol specific fields (e.g., for processing the packet by the server) and may also include a body containing the binary or string representation of the object. This body may be marked as containing binary data when encoded into a binary representation and may be marked as text when encoded into a string/textual representation. Packet building subsystem 116 may pass each request to communication subsystem 112.

Encoding/decoding subsystem 114 may also process received messages that need to be decoded and decrypted. In particular, encoding/decoding subsystem 114 may receive (e.g., via communication subsystem 114) a second message generated by a second user within the group. The second message may include a second identifier of the second user. For example, another user within the group may send a response message to the original message. The computing device associated with the user may encrypt and encode the message as described above. That computing device may use a ratchet associated with that user to encrypt the message. When decrypting/decoding the message, encoding/decoding subsystem 114 may identify a ratchet associated with that other user and use that ratchet to decode the message.

When encoding/decoding subsystem 114 receives the second message, encoding/decoding subsystem 114 may first decode the message from the binary or string representation into the name-value pairs and the encrypted message. Encoding/decoding subsystem 114 may then locate a ratchet within the binary tree associated with the user that generated and encrypted the message. In particular, encoding/decoding subsystem 114 may locate, based on the second identifier within a binary tree, a second leaf representing the second user. As discussed above, the binary tree may store a plurality of user identifiers of a plurality of users with the group and a plurality of key generation secrets. Each key generation secret may be a last generated key generation secret for a corresponding user. For example, encoding/decoding subsystem 114 may use any search algorithm or binary search algorithm to identify the correct leaf based on an identifier of the second user. Encoding/decoding subsystem 114 may then retrieve, from the second leaf, a latest key generation secret associated with the second user.

When the latest key generation secret is retrieved, encoding/decoding subsystem 114 may use that key generation secret to generation a decryption key, as described above. In particular, encoding/decoding subsystem 114 may generate, using the key generation algorithm, a subsequent key generation secret and a subsequent decryption key. The subsequent key generation secret and the subsequent decryption key may be separately generated on a device of the second user. That is, the computing device of the second user may have used the same last key generation secret as input to the key generation algorithm to generate a message encryption key and a new key generation secret. In addition, each computing device of the recipient may use the same last key generation secret (e.g., retrieved from a leaf node of a binary tree for the group) to generate a message decryption key which is identical to the message encryption key. Thus, the key is used for both message encryption and decryption in a symmetrical encryption/decryption scheme. That is, the subsequent decryption key was used to encrypt the second message on the device of the second user.

Encoding/decoding subsystem 114 may also process requests (e.g., from the server) to add users to the group by updating the local binary tree associated with the group based on instructions from the server. In particular, encoding/decoding subsystem 114 may receive, from the server, an update request, indicating that a new user has joined the group. The update request may include one or more instructions for updating a binary tree that stores (1) a plurality of user identifiers of a plurality of users within the group and (2) a plurality of key generation secrets. As discussed above, each key generation secret of the plurality of key generation secrets may be used to derive a newgenerated key generation secret for each user in the group. Encoding/decoding subsystem 114 may execute the one or more instructions to add a leaf to the binary tree corresponding to the new user. For example, encoding/decoding subsystem 114 may use an appropriate algorithm to add a leaf to a binary tree.

Returning to the encoding process, communication subsystem 112 may transmit each hypertext transport protocol request 220 to a server application 204. Server application 204 may reside on server 104. Server application 204 may receive the hypertext transport protocol requests 240 that include binary representations or string representations associated with an encrypted message object. As discussed above, the encrypted message object may include a message from a user within a group to the group. Server application 204 may decode the received representations into a plurality of name-value pairs 242 associated with the encrypted message object. The decoding operations may be performed using an encoding/decoding subsystem similar to one used by sender application 202. For example, encoding/decoding subsystem 114 may receive the encoded message object and output a data structure as shown in FIG. 3.

When the name-value pairs are decoded, server application 204 may determine, using the name-value pairs, a plurality of recipients 244 associated with the encrypted message object. For example, the server application may identify a group that the message was sent to and retrieve recipient identifiers associated with the group. Server application 204 may generate new hypertext transport protocol messages 246 that include the binary or string representation(s) and transmit those messages 248 to client devices with active recipient applications 206 (e.g., to those recipients that are currently active).

Server application 204 may also store the binary representation(s) in a database to send to recipients when they become active (e.g., connect to the server and request messages). Thus, server application 204 may determine that a client device associated with a recipient has become active and generate new hypertext transport protocol messages that include the binary representations. Server application 204 may wait until the client device (e.g., one of the computing devices 108a-108n) contacts the server with device status. The functionality may be built into the application on the device (e.g., an application that is executed in a web browser). Server application 204 may then transmit those hypertext transport protocol messages to a client device associated with an active recipient application. In some embodiments, the generated messages may be generated using a different protocol instead of the hypertext transport protocol. The messages may be generated for any protocol that enables transport of a wide area network (e.g., the Internet) and/or a local area network.

In some embodiments, when a user is inactive, the message processing system 102 (e.g., server component of message processing system 102) may transmit the encrypted message to another server in a server network for storage until the recipient's device is active. In particular, message processing system 102 may determine that a first user device associated with a first recipient is inactive (e.g., based on not receiving a device status for a threshold time period). Thus, a user device (e.g., a computing device) when active may periodically transmit a status to the server. Based on determining that the first user device is inactive, message processing system 102 may identify, based on prior communications with the first user device, a server within a server network for communicating with the first user device. For example, a server may be part of a server network that is able to store encrypted message objects for recipients (e.g., in different geographical zones). Thus, if a recipient has last connected to a server within a first geographical zone and the server that received the encrypted message from the sender is in a second geographical zone. The server within the second geographical zone may send the encrypted message to the server within the first geographical zone for storage until the user device is active again. Thus, message processing system 102 may transmit, to a different server within the server network, a command to store the encrypted message object until the first user device is active.

In some embodiments, the server (e.g., server component of message processing system 102) may receive a request to add a new user to a particular group and after authenticating the request may perform the following operations to perform the request. Message processing system 102 may retrieve a binary tree associated with the group. As discussed above, the binary tree may include a plurality of user identifiers of a plurality of users with the group and a plurality of key generation secrets. Furthermore, each key generation secret may be a last generated key generation secret for a corresponding user. For example, the request to add a new user to the group may include a group identifier. Thus, message processing system 102 may identify a binary tree associated with the group identifier and retrieve that binary tree. Message processing system 102 may then add a new leaf to the binary tree representing the new user. As discussed above, message processing system 102 may add a lead node to the binary tree and perform secret calculations up the tree to ensure that the new leaf is properly created and may be used for encryption/decryption operations for the new user. Message processing system 102 may then transmit, to each user within the group, one or more instructions to update a corresponding binary tree. However, message processing system 102 may not have access to the binary tree and may only be used as a middleman to transmit the encrypted binary tree between client devices.

In some embodiments, message processing system 102 may transmit the full tree (e.g., in an encrypted format) to a computing device of each group member so that each computing device may replace the binary tree for the group with the updated binary tree. In some embodiments, message processing system 102 may transmit instructions for updating the binary tree in the same way that the server made the updates. For example, the instructions may include instructions to add a leaf node to the tree and calculate secrets all the way up to the root node, as described above.

In some embodiments, the server (e.g., server component of message processing system 102) may receive a request to add a new group and after authenticating the request may perform the following operations to perform the request. Message processing system 102 may receive a request to create a new group. The request may include one or more user identifiers identifying one or more users to add to the new group. In response to or based on the request, message processing system 102 may generate a new binary tree with a root node and one or more leaf nodes representing each user of the one or more users. Message processing system 102 may then generate a root key generation secret for the root node, for example, as discussed above in relation to generating a root secret. Furthermore, as discussed above, message processing system 102 may, based on the root key generation secret, generate a corresponding initial key generation secret for each node in the new binary tree. When the initial key generation secrets are generated, message processing system 102 may transmit the new tree to the members of the group. In some embodiments, message processing system 102 may transmit one or more commands to computing devices of group members to generate the binary tree locally. The command may include the root key generation secret that may be used by the computing devices to build the binary tree structure that is identical to the one built on a server. In some embodiments, the server may not even build the binary tree locally to avoid security issues for instances when the server is compromised. Thus, binary trees may only exist on the computing nodes of group members.

Accordingly, when a server receives group join instructions, the server may generate instructions for computing devices to update local binary trees, as the server would not maintain local binary trees, as discussed above. In particular, message processing system 102 (e.g., server component of message processing system 102) may receive a group join request to add a new user to the new group. The request may include an identifier of the group. In response, message processing system 102 may generate group join instructions for a user device of the new user (and other computing devices of the members of the group). The group join instructions may include the root key generation secret, and may instruct the user device to calculate a plurality of key generation secrets for a plurality of nodes within the new binary tree. That is, the group join instructions may be a roadmap for the computing device to build a new binary tree based on the root secret, as described above. In some embodiments, the same instructions may be sent to computing devices of other members of the group to rebuild their local binary trees. However, in some embodiments, message processing system 102 may send binary tree update instructions to those user devices. As referred to herein, the term "user device" and the term "computing device" may be used interchangeably. Thus, message processing system 102 may transmit the group join instructions to the user device.

In some embodiments, the server (e.g., server component of message processing system 102) may receive a request to remove a user from a group and after authenticating the request may perform the following operations. The request may include an identifier of the user or the user's devices to be removed and an identifier of the group from which to remove the user. Message processing system 102 may generate group removal instructions for the other devices remaining within the group. The group removal instructions may include instructions to remove each leaf representing the user's specified devices from the current binary tree. For example, message processing system 102 may use a group identifier to identify the correct binary tree to update. It may then identify each leaf in the tree corresponding to the specified user or devices to remove, prune those leaves from the tree, prune additional interior nodes to compact the tree, rebuild the secrets in tree, and broadcast the updated binary tree to each remaining device in the group.

In some embodiments, the server (e.g., server component of message processing system 102) may receive a request to delete a group and after authenticating the request may perform the following operations to perform the request. Thus, message processing system 102 may receive a delete request to delete the group. The delete request may include a group identifier of the group. Based on the group identifier, message processing system 102 may determine a binary tree associated with the group. For example, each binary tree may include one or more metadata fields. Metadata fields may include a field storing a group identifier for the group corresponding to the binary tree. Thus, message processing system 102 may transmit a command to user devices of users in the group to delete the binary tree corresponding to the group identifier. For example, the command may include the group identifier.

Figure 4:
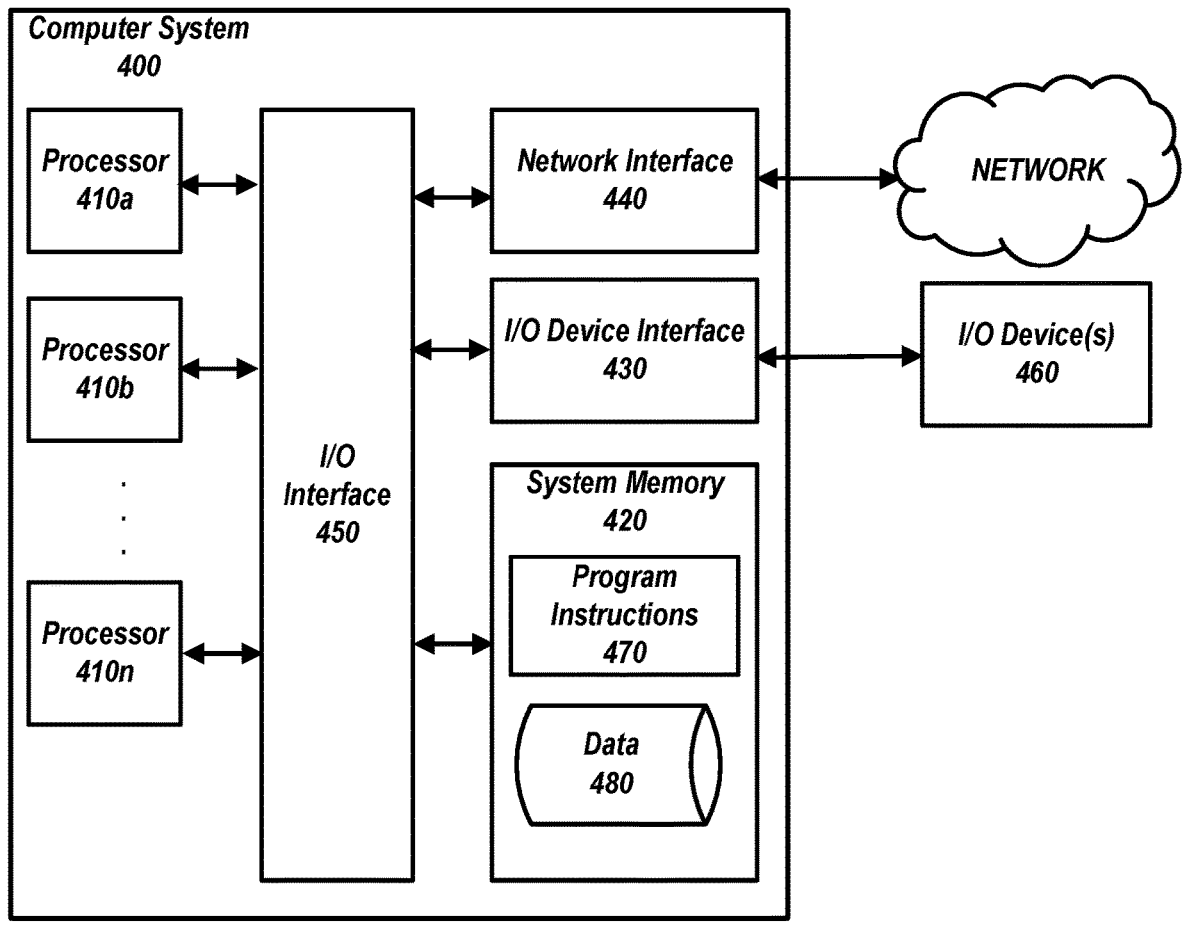
FIG. 4 shows an example computing system that may be used in accordance with some embodiments of this disclosure.

FIG. 4 is a diagram that illustrates an exemplary computing system 400 in accordance with embodiments of the present technique. Various portions of systems and methods described herein, may include or be executed on one or more computer systems similar to computing system 400. Further, processes and modules described herein may be executed by one or more processing systems similar to that of computing system 400.

Computing system 400 may include one or more processors (e.g., processors 410*a*-410*n*) coupled to system memory 420, an input/output I/O device interface 430, and a network interface 440 via an input/output (I/O) interface 450. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 400. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 420). Computing system 400 may be a units-processor system including one processor (e.g., processor 410*a*), or a multi-processor system including any number of suitable processors (e.g., 410*a*-410*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 400 may include a plurality of computing devices (e.g., distributed computer systems) to implement various processing functions.

I/O device interface 430 may provide an interface for connection of one or more I/O devices 460 to computing system 400. I/O devices may include devices that receive input (e.g., from a user) or output information (e.g., to a user). I/O devices 460 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 460 may be connected to computing system 400 through a wired or wireless connection. I/O devices 460 may be connected to computing system 400 from a remote location. I/O devices 460 located on a remote computer system, for example, may be connected to computing system 400 via a network and network interface 440.

Network interface 440 may include a network adapter that provides for connection of computing system 400 to a network. Network interface 440 may facilitate data exchange between computing system 400 and other devices connected to the network. Network interface 440 may support wired or wireless communication. The network may include an electronic communication network, such as the Internet, a local area network (LAN), a wide area network (WAN), a cellular communications network, or the like.

System memory 420 may be configured to store program instructions 470 or data 480. Program instructions 470 may be executable by a processor (e.g., one or more of processors 410a-410n) to implement one or more embodiments of the present techniques. Instructions 470 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 420 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 420 may include a non-transitory computer readable storage medium that may have program instructions stored thereon that are executable by a computer processor (e.g., one or more of processors 410a-410n) to cause the subject matter and the functional operations described herein. A memory (e.g., system memory 420) may include a single memory device and/or a plurality of memory devices (e.g., distributed memory devices).

I/O interface 450 may be configured to coordinate I/O traffic between processors 410a-410n, system memory 420, network interface 440, I/O devices 460, and/or other peripheral devices. I/O interface 450 may perform protocol, timing, or other data transformations to convert data signals from one component (e.g., system memory 420) into a format suitable for use by another component (e.g., processors 410a-410n). I/O interface 450 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 400 or multiple computer systems 400 configured to host different portions or instances of embodiments. Multiple computer systems 400 may provide for parallel or sequential processing/execution of one or more portions of the techniques described herein.

Those skilled in the art will appreciate that computing system 400 is merely illustrative and is not intended to limit the scope of the techniques described herein. Computing system 400 may include any combination of devices or software that may perform or otherwise provide for the performance of the techniques described herein. For example, computing system 400 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 400 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 400 may be transmitted to computing system 400 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

Figure 5:
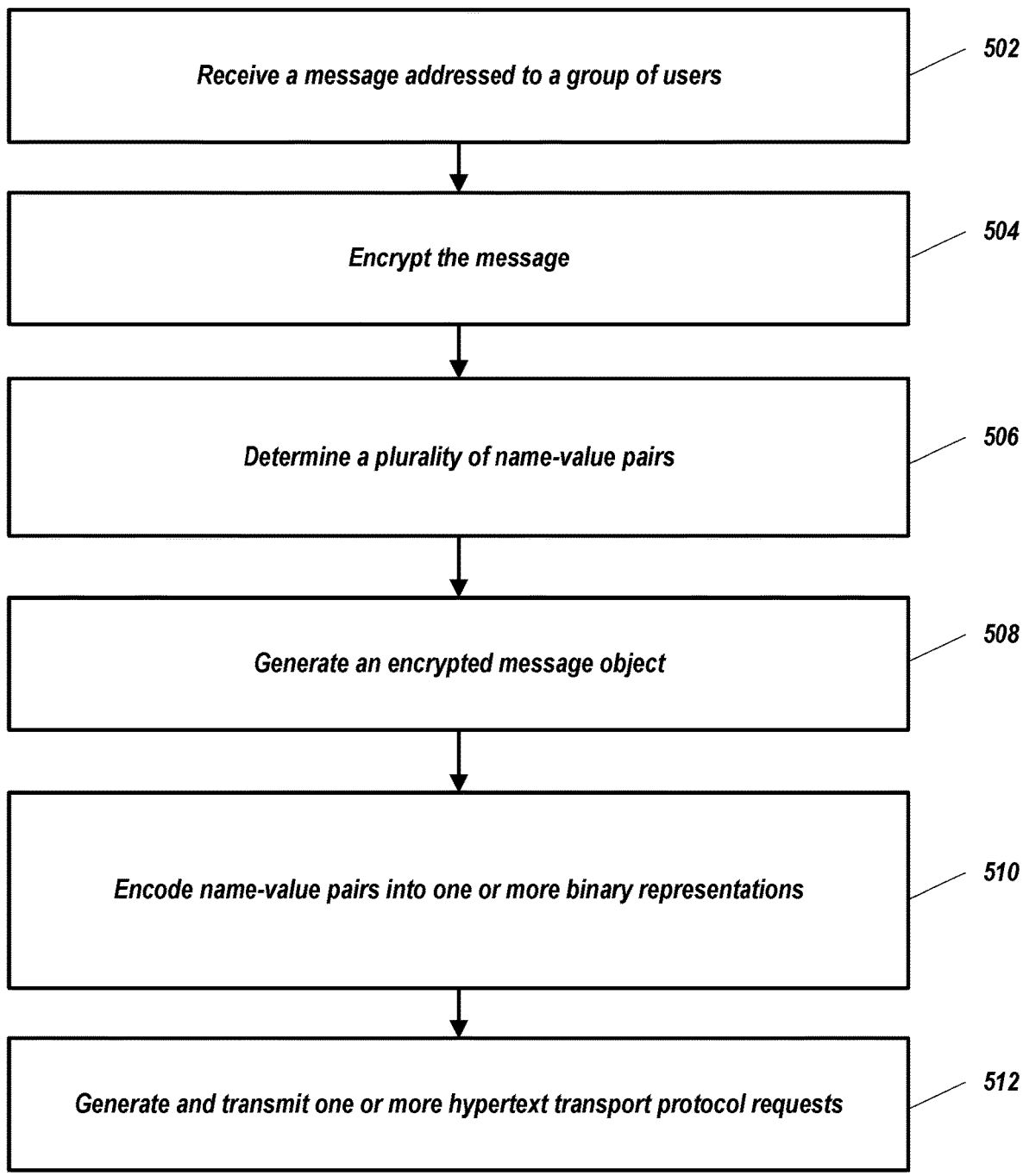
FIG. 5 shows an example flowchart of operations performed on a client device, in accordance with some embodiments of this disclosure.

FIG. 5 shows an example flowchart of message sender operations. At 502, message processing system 102 receives a message addressed to a group of users. For example, message processing system 102 may be hosted on a computer system 400. Thus, the message may be received via I/O device(s) 460 (e.g., from a keyboard or microphone) or through network interface 440 (e.g., from a Bluetooth device) and then passed via I/O Interface 450 to system memory 420. At 504, message processing system 102 (e.g., using one or more components in system 100 (FIG. 1) and/or computing system 400 via one or more processors 410a-410n and system memory 420 (FIG. 4)) encrypts the message (e.g., using the MLS protocol). At 506, message processing system 102 (e.g., using one or more components in system 100 (FIG. 1) and/or computing system 400 via one or more processors 410a-410n, I/O interface 450, and/or system memory 420 (FIG. 4)) determines a plurality of name-value pairs.

At 508, message processing system 102 (e.g., using one or more components in system 100 (FIG. 1) and/or computing system 400 via one or more processors 410a-410n (FIG. 4)) generates an encrypted message object. At 510, message processing system 102 (e.g., using one or more components in system 100 (FIG. 1) and/or computing system 400 (FIG. 4)) encodes name-value pairs into a plurality of binary representations. At 512, message processing system 102 (e.g., using one or more components in system 100 (FIG. 1) and/or computing system 400 via the network interface 440 (FIG. 4)) generates and transmits hypertext transport protocol requests.

Figure 6:
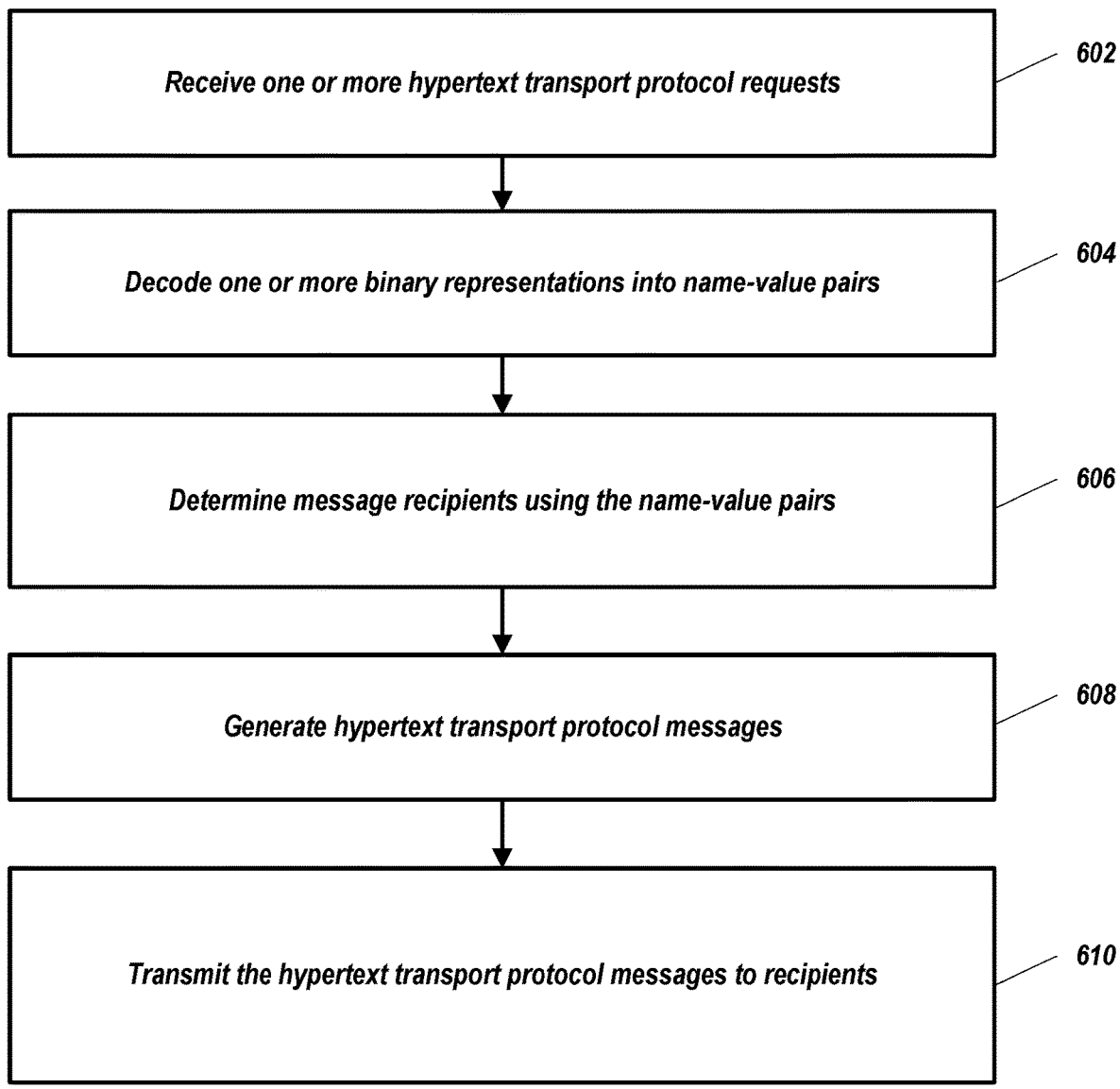
FIG. 6 shows an example flowchart of operations performed on a server, in accordance with some embodiments of this disclosure.

FIG. 6 shows an example flowchart of the actions involved in server operations. At 602, server application 204 (e.g., using one or more components of computing system 400 via one or more processors 410a-410n (FIG. 4)) receives hypertext transport protocol requests that include binary representations at 604, message server application 204 (e.g., using one or more components of computing system 400 via one or more processors 410a-410n (FIG. 4)), decodes the binary representations into name-value pairs. At 606, server application 204 (e.g., using one or more components of computing system 400 via one or more processors 410a-410n (FIG. 4)), determines message recipients using the name-value pairs. At 608, server application 204 (e.g., using one or more components of computing system 400 via one or more processors 410a-410n (FIG. 4)), generate new hypertext transport protocol requests. At 610, server application 204 (e.g., using one or more components of computing system 400 via one or more processors 410a-410n (FIG. 4)), transmit the hypertext transport protocol requests to recipients. In some embodiments, the transmission may be to active recipients (e.g., those that are currently connected to the server).

It is contemplated that the actions or descriptions of FIG. 5 and FIG. 6 may be used with any other embodiment of this disclosure. In addition, the actions and descriptions described in relation to FIG. 5 and FIG. 6 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or components discussed in relation to FIGS. 1-4 could be used to perform one or more of the actions in FIG. 5 and/or in FIG. 6.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example, such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, third-party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. But the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to cost constraints, some features disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or"

is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for providing end-to-end message encryption over hypertext transfer protocol, the method comprising: receiving an input comprising a message from a user addressed to a group, wherein the user is a member of the group; retrieving a first key generation secret generated by a key generation algorithm for the user, wherein the key generation algorithm generates, using a key generation secret, a new key generation secret and a new encryption key for message encryption; receiving, from the key generation algorithm based on inputting the first key generation secret, a second key generation secret and a first encryption key; encrypting the message using the first encryption key into an encrypted message; storing the second key generation secret in association with the user; determining a plurality of name-value pairs from metadata associated with the message; generating an encrypted message object, wherein the encrypted message object comprises a name-value pair for the encrypted message and the plurality of name-value pairs; encoding name-value pairs associated with the encrypted message object into one or more transport representations; generating a hypertext transport protocol request for each transport representation of the one or more transport representations; and transmitting each hypertext transport protocol request to a server.

2. The method of any of prior embodiments, wherein encoding the plurality of name-value pairs associated with the encrypted message object into the one or more transport representations further comprises: determining whether the server supports binary encoding; in response to determining that the server supports the binary encoding, encoding the plurality of name-value pairs associated with the encrypted message object into one or more binary representations; and in response to determining that the server does not support the binary encoding, encoding the plurality of name-value pairs associated with the encrypted message object into one or more string representations.

3. The method of any of prior embodiments, wherein retrieving the first key generation secret comprises: accessing an encrypted binary tree that stores (1) a plurality of user identifiers of a plurality of users with the group and (2) a plurality of key generation secrets, wherein each key generation secret of the plurality of key generation secrets is a last generated key generation secret for a corresponding user; decrypting the encrypted binary tree into a data structure representing a binary tree; and retrieving the first key generation secret from a leaf of the binary tree associated with the user.

4. The method of any of prior embodiments, wherein storing the second key generation secret further comprises: accessing, within the web browser storage, an encrypted binary tree that stores (1) a plurality of user identifiers of a plurality of users with the group and (2) a plurality of key generation secrets, wherein each key generation secret of the plurality of key generation secrets is a last generated key generation secret for a corresponding user; decrypting the encrypted binary tree into a data structure representing the binary tree; replacing the first key generation secret within the leaf with the second key generation secret; and encrypting an updated binary tree and store the updated binary tree in the web browser storage.

5. The method of any of prior embodiments, further comprising: receiving a second message generated by a second user within the group, wherein the second message comprises a second identifier of the second user; locating, based on the second identifier within a binary tree, a second leaf representing the second user, wherein binary tree stores (1) a plurality of user identifiers of a plurality of users with the group and (2) a plurality of key generation secrets, wherein each key generation secret of the plurality of key generation secrets is a last generated key generation secret for a corresponding user; retrieving, from the second leaf, a latest key generation secret associated with the second user; and generating, using the key generation algorithm, a subsequent key generation secret and a subsequent decryption key, wherein the subsequent key generation secret and the subsequent decryption key was separately generated on a device of the second user, and wherein the subsequent decryption key was used to encrypt the second message on the device of the second user.

6. The method of any of prior embodiments, further comprising: receiving, from the server, an update request, indicating that a new user has joined the group, wherein the update request comprises one or more instructions for updating a binary tree that stores (1) a plurality of user identifiers of a plurality of users with the group and (2) a plurality of key generation secrets, wherein each key generation secret of the plurality of key generation secrets is a last generated key generation secret for a corresponding user; and executing the one or more instructions to add a leaf to the binary tree corresponding to the new user.

7. A method for providing end-to-end message encryption over hypertext transfer protocol, the method comprising: receiving a plurality of hypertext transport protocol requests, wherein the plurality of hypertext transport protocol requests comprises one or more binary representations associated with an encrypted message object, the encrypted message object comprising a message from a user within a group to the group; decoding the one or more binary representations into a plurality of name-value pairs associated with the encrypted message object; determining, using the plurality of name-value pairs, a plurality of recipients associated with the encrypted message object; generating one or more hypertext transport protocol messages comprising the one or more binary representations; and transmitting the one or more hypertext transport protocol messages to a subset of the plurality of recipients that are currently active.

8. The method of any of prior embodiments, further comprising: storing the one or more binary representations in a database; determining that a client device associated with a recipient of the plurality of recipients has become active; generating one or more new hypertext transport protocol messages comprising the one or more binary representations; and transmitting the one or more new hypertext transport protocol messages to the client device.

9. The method of any of prior embodiments, further comprising: receiving a request to add a new user to the group; retrieving a binary tree associated with the group, wherein the binary tree comprises (1) a plurality of user identifiers of a plurality of users with the group and (2) a plurality of key generation secrets, wherein each key generation secret of the plurality of key generation secrets is a last generated key generation secret for a corresponding user; adding a new leaf to the binary tree representing the new user; and transmitting, to each user within the group, one or more instructions to update a corresponding binary tree.

10. The method of any of prior embodiments, further comprising: receiving a request to create a new group, wherein the request comprises one or more user identifiers identifying one or more users to add to the new group; generating a new binary tree with a root node and one or more leaf nodes representing each user of the one or more users; generating a root key generation secret for the root node; and based on the root key generation secret, generating a corresponding initial key generation secret for each node in the new binary tree.

11. The method of any of prior embodiments, further comprising: receiving a group join request to add a new user to the new group; generating group join instructions for a user device of the new user, wherein the group join instructions comprise the root key generation secret, and wherein the group join instructions instruct the user device to calculate a plurality of key generation secrets for a plurality of nodes within the new binary tree; and transmitting the group join instructions to the user device.

12. The method of any of prior embodiments, further comprising: receiving a group removal request to remove the user from the group; generating group removal instructions for user devices of users within the group, wherein the group removal instructions comprise instructions to remove a leaf representing the user from the new binary tree; and transmitting the group removal instructions to the user devices.

13. The method of any of prior embodiments, further comprising: receiving a delete request to delete the group, wherein the delete request comprises a group identifier of the group; determining, based on the group identifier, a binary tree associated with the group; and transmitting a command to user devices of users in the group to delete the binary tree.

14. The method of any of prior embodiments, wherein transmitting the one or more hypertext transport protocol messages to the subset of the plurality of recipients that are currently active comprises: determining that a first user device associated with a first recipient is inactive; based on determining that the first user device is inactive, identifying, based on prior communications with the first user device, a server within a server network for communicating with the first user device; and transmitting, to the server, a command to store the encrypted message object until the first user device is active.

15. A tangible, non-transitory, machine-readable medium storing instructions that, when executed by a data processing apparatus, cause the data processing apparatus to perform operations comprising those of any of embodiments 1-14.

16. A system comprising: one or more processors; and memory storing instructions that, when executed by the processors, cause the processors to effectuate operations comprising those of any of embodiments 1-14.

17. A system comprising means for performing any of embodiments 1-14.

What is claimed is:

1. A system for providing end-to-end message encryption over hypertext transfer protocol, the system comprising:
 one or more processors; and
 a non-transitory computer-readable storage medium storing instructions, which when executed by the one or more processors cause the one or more processors to:
  receive, using an application executed within a web browser, an input comprising a message from a user addressed to a group, wherein the user is a member of the group;
  retrieve, from web browser storage, a first key generation secret generated by a key generation algorithm for the user, wherein the key generation algorithm generates, using a key generation secret, a new key generation secret and a new encryption key for message encryption;
  receive, from the key generation algorithm based on inputting the first key generation secret, a second key generation secret and a first encryption key;
  encrypt the message using the first encryption key into an encrypted message;
  store the second key generation secret within the web browser storage, wherein the second key generation secret is stored in association with the user;
  determine a plurality of name-value pairs from metadata associated with the encrypted message;
  generate an encrypted message object, wherein the encrypted message object comprises a name-value pair for the encrypted message and the plurality of name-value pairs;
  generate a cryptographic signature for the encrypted message object;
  add the cryptographic signature as a new name-value pair to the encrypted message object;

encode name-value pairs associated with the encrypted message object into one or more transport representations;

generate a hypertext transport protocol request for each transport representation of the one or more transport representations; and transmit each hypertext transport protocol request to a server.

2. The system of claim 1, wherein the instructions for encoding the plurality of name-value pairs associated with the encrypted message object into the one or more transport representations cause the one or more processors to:

determine whether the server supports binary encoding;

in response to determining that the server supports the binary encoding, encode the plurality of name-value pairs associated with the encrypted message object into one or more binary representations; and in response to determining that the server does not support the binary encoding, encode the plurality of name-value pairs associated with the encrypted message object into one or more string representations.

3. The system of claim 1, wherein the instructions for retrieving, from the web browser storage, the first key generation secret, cause the one or more processors to:

access, within the web browser storage, an encrypted binary tree that stores (1) a plurality of user identifiers of a plurality of users with the group and (2) a plurality of key generation secrets, wherein each key generation secret of the plurality of key generation secrets is a last generated key generation secret for a corresponding user;

decrypt the encrypted binary tree into a data structure representing a binary tree; and retrieve the first key generation secret from a leaf of the binary tree associated with the user.

4. The system of claim 1, wherein the instructions for storing the second key generation secret within the web browser storage further cause the one or more processors to:

access, within the web browser storage, an encrypted binary tree that stores (1) a plurality of user identifiers of a plurality of users with the group and (2) a plurality of key generation secrets, wherein each key generation secret of the plurality of key generation secrets is a last generated key generation secret for a corresponding user;

decrypt the encrypted binary tree into a data structure representing a binary tree;

replace the first key generation secret within a leaf of the binary tree with the second key generation secret; and encrypt an updated binary tree and store the updated binary tree in the web browser storage.

5. The system of claim 1, wherein the instructions further cause the one or more processors to:

receive a second message generated by a second user within the group, wherein the second message comprises a second identifier of the second user;

locate, based on the second identifier within a binary tree, a second leaf representing the second user, wherein the binary tree stores (1) a plurality of user identifiers of a plurality of users with the group and (2) a plurality of key generation secrets, wherein each key generation secret of the plurality of key generation secrets is a last generated key generation secret for a corresponding user;

retrieve, from the second leaf, a latest key generation secret associated with the second user; and generate, using the key generation algorithm, a subsequent key generation secret and a subsequent decryption key, wherein the subsequent key generation secret and the subsequent decryption key was separately generated on a device of the second user, and wherein the subsequent decryption key was used to encrypt the second message on the device of the second user.

6. The system of claim 1, wherein the instructions further cause the one or more processors to:

receive, from the server, an update request, indicating that a new user has joined the group, wherein the update request comprises one or more instructions for updating a binary tree that stores (1) a plurality of user identifiers of a plurality of users with the group and (2) a plurality of key generation secrets, wherein each key generation secret of the plurality of key generation secrets is a last generated key generation secret for a corresponding user; and execute the one or more instructions to add a leaf to the binary tree corresponding to the new user.

7. A method for providing end-to-end message encryption over hypertext transfer protocol, the method comprising:

receiving an input comprising a message from a user addressed to a group, wherein the user is a member of the group;

retrieving a first key generation secret generated by a key generation algorithm for the user, wherein the key generation algorithm generates, using a key generation secret, a new key generation secret and a new encryption key for message encryption;

receiving, from the key generation algorithm based on inputting the first key generation secret, a second key generation secret and a first encryption key;

encrypting the message using the first encryption key into an encrypted message;

storing the second key generation secret in association with the user;

determining a plurality of name-value pairs from metadata associated with the encrypted message;

generating an encrypted message object, wherein the encrypted message object comprises a name-value pair for the encrypted message and the plurality of name-value pairs;

encoding name-value pairs associated with the encrypted message object into one or more transport representations;

generating a hypertext transport protocol request for each transport representation of the one or more transport representations; and transmitting each hypertext transport protocol request to a server.

8. The method of claim 7, wherein encoding the plurality of name-value pairs associated with the encrypted message object into the one or more transport representations further comprises:

determining whether the server supports binary encoding;

in response to determining that the server supports the binary encoding, encoding the plurality of name-value pairs associated with the encrypted message object into one or more binary representations; and in response to determining that the server does not support the binary encoding, encoding the plurality of name-value pairs associated with the encrypted message object into one or more string representations.

9. The method of claim 7, wherein retrieving the first key generation secret comprises:

accessing an encrypted binary tree that stores (1) a plurality of user identifiers of a plurality of users with the group and (2) a plurality of key generation secrets, wherein each key generation secret of the plurality of key generation secrets is a last generated key generation secret for a corresponding user;

decrypting the encrypted binary tree into a data structure representing a binary tree; and retrieving the first key generation secret from a leaf of the binary tree associated with the user.

10. The method of claim 7, wherein storing the second key generation secret further comprises:

accessing, within web browser storage, an encrypted binary tree that stores (1) a plurality of user identifiers of a plurality of users with the group and (2) a plurality of key generation secrets, wherein each key generation secret of the plurality of key generation secrets is a last generated key generation secret for a corresponding user;

decrypting the encrypted binary tree into a data structure representing the binary tree;

replacing the first key generation secret within a leaf with the second key generation secret; and encrypting an updated binary tree and store the updated binary tree in the web browser storage.

11. The method of claim 7, further comprising:

receiving a second message generated by a second user within the group, wherein the second message comprises a second identifier of the second user;

locating, based on the second identifier within a binary tree, a second leaf representing the second user, wherein the binary tree stores (1) a plurality of user identifiers of a plurality of users with the group and (2) a plurality of key generation secrets, wherein each key generation secret of the plurality of key generation secrets is a last generated key generation secret for a corresponding user;

retrieving, from the second leaf, a latest key generation secret associated with the second user; and generating, using the key generation algorithm, a subsequent key generation secret and a subsequent decryption key, wherein the subsequent key generation secret and the subsequent decryption key was separately generated on a device of the second user, and wherein the subsequent decryption key was used to encrypt the second message on the device of the second user.

12. The method of claim 7, further comprising:

receiving, from the server, an update request, indicating that a new user has joined the group, wherein the update request comprises one or more instructions for updating a binary tree that stores (1) a plurality of user identifiers of a plurality of users with the group and (2) a plurality of key generation secrets, wherein each key generation secret of the plurality of key generation secrets is a last generated key generation secret for a corresponding user; and executing the one or more instructions to add a leaf to the binary tree corresponding to the new user.

13. A system for providing end-to-end message encryption over hypertext transfer protocol, the system comprising:

one or more processors; and a non-transitory computer-readable storage medium storing instructions, which when executed by the one or more processors cause the one or more processors to:

receive a plurality of hypertext transport protocol requests, wherein the plurality of hypertext transport protocol requests comprises one or more binary representations associated with an encrypted message object, the encrypted message object comprising a message from a user within a group to the group;

store the one or more binary representations in a database;

decode the one or more binary representations into a plurality of name-value pairs associated with the encrypted message object;

determine, using the plurality of name-value pairs, a plurality of recipients associated with the encrypted message object;

generate one or more hypertext transport protocol messages comprising the one or more binary representations;

transmit the one or more hypertext transport protocol messages to a subset of the plurality of recipients that are currently active;

determine that a client device associated with a recipient of the plurality of recipients has become active;

generate one or more new hypertext transport protocol messages comprising the one or more binary representations; and transmit the one or more new hypertext transport protocol messages to the client device.

14. The system of claim 13, wherein the instructions further cause the one or more processors to:

receive a request to add a new user to the group;

retrieve a binary tree associated with the group, wherein the binary tree comprises (1) a plurality of user identifiers of a plurality of users with the group and (2) a plurality of key generation secrets, wherein each key generation secret of the plurality of key generation secrets is a last generated key generation secret for a corresponding user;

add a new leaf to the binary tree representing the new user; and transmit, to each user within the group, one or more instructions to update a corresponding binary tree.

15. The system of claim 13, wherein the instructions further cause the one or more processors to:

receive a request to create a new group, wherein the request comprises one or more user identifiers identifying one or more users to add to the new group;

generate a new binary tree with a root node and one or more leaf nodes representing each user of the one or more users;

generate a root key generation secret for the root node; and based on the root key generation secret, generate a corresponding initial key generation secret for each node in the new binary tree.

16. The system of claim 15, where in the instructions further cause the one or more processors to:

receive a group join request to add a new user to the new group;

generate group join instructions for a user device of the new user, wherein the group join instructions comprise the root key generation secret, and wherein the group join instructions instruct the user device to calculate a plurality of key generation secrets for a plurality of nodes within the new binary tree; and transmit the group join instructions to the user device.

17. The system of claim 15, where in the instructions further cause the one or more processors to:

receive a group removal request to remove the user from the group;

generate group removal instructions for user devices of users within the group, wherein the group removal instructions comprise instructions to remove a leaf representing the user from the new binary tree; and transmit the group removal instructions to the user devices.

18. The system of claim 13, wherein the instructions further cause the one or more processors to:

receive a delete request to delete the group, wherein the delete request comprises a group identifier of the group;

determine, based on the group identifier, a binary tree associated with the group; and transmit a command to user devices of users in the group to delete the binary tree.

19. The system of claim 13, wherein the instructions for transmitting the one or more hypertext transport protocol messages to the subset of the plurality of recipients that are currently active comprises:

determining that a first user device associated with a first recipient is inactive;

based on determining that the first user device is inactive, identifying, based on prior communications with the first user device, a server within a server network for communicating with the first user device; and transmitting, to the server, a command to store the encrypted message object until the first user device is active.

* * * * *